United States Patent [19]

Veverka et al.

[11] Patent Number: 4,975,797
[45] Date of Patent: Dec. 4, 1990

[54] ARRESTER WITH EXTERNAL ISOLATOR

[75] Inventors: Edward F. Veverka; Gary L. Goedde, both of Racine, Wis.; Stanley S. Kershaw, Portville, N.Y.

[73] Assignee: Cooper Industries, Inc., Houston, Tex.

[21] Appl. No.: 394,523

[22] Filed: Aug. 16, 1989

[51] Int. Cl.[5] .............................................. H02H 7/04
[52] U.S. Cl. ........................................ 361/35; 361/38; 361/40; 361/127; 361/131
[58] Field of Search ...................... 361/35, 38, 39, 40, 361/117, 118, 126, 127, 131, 132

[56] References Cited

U.S. PATENT DOCUMENTS

| | | | |
|---|---|---|---|
| 3,400,301 | 9/1968 | Misare | 361/39 X |
| 3,666,992 | 5/1972 | Goodman | 361/39 X |
| 4,320,432 | 3/1982 | Duenke | 361/132 X |
| 4,604,673 | 8/1986 | Schoendube | 361/38 |
| 4,743,996 | 5/1988 | Book | 361/38 X |

Primary Examiner—Derek S. Jennings
Attorney, Agent, or Firm—Laff, Whitesel, Conte & Saret

[57] ABSTRACT

An arrester for an under oil transformer is connected between a primary bushing lead and an insulator/isolator penetrating the wall of a housing which encloses the oil, arrester, and transformer parts. A ground wire outside the housing is removably connected to the isolator which functions as a circuit disconnector. The ground wire is removed to open circuit the arrester so that the transformer may be tested without having to disable any parts in the housing. Responsive to an arrester failure, the ground wire is blown away to give a visual indication of the failure. The blowing away of the ground wire eliminates the need for the arrester to fail in an open circuit condition.

15 Claims, 2 Drawing Sheets

ARRESTER WITH EXTERNAL ISOLATOR

FIELD OF THE INVENTION

This invention relates to devices for protecting single and multiphase high voltage apparatus to provide overvoltage protection and apparatus test, and more particularly relates to the means for testing single and multiphase high voltage apparatus equipped with surge arresters or surge protectors and/or test the surge arrester without the necessity of disassembling the apparatus. Even more specifically, this invention relates to an oil filled apparatus such as a transformer having a surge arrester of the metal oxide varistor (MOV) type designed for under oil mounting and an external isolator.

BACKGROUND

Very often, it is necessary to test for any one of a number of reasons both in the field and prior to being shipped the single phase and multiphase voltage apparatus, i.e., transformer and/or its surge arrester. For example, after a transformer is subjected to high voltage transients, which could damage or destroy it, it may be necessary to conduct tests in order to determine whether a part should be replaced. During manufacture there could be faulty connections or the like. Therefore, it may be necessary to test the transformer after manufacture and before shipment. It may also be desirable, and often necessary to conduct routine tests on the transformer in order to determine that it is in good working order.

Oil filled transformers and metal oxide varistor arresters are known. Generally, it is necessary to provide an arrester or a surge protector which protects the transformer against high voltage transients. For this reason, it is common practice to connect an arrester which will conduct transients from a power line to ground ahead of or at the transformer when high voltage occurs. The surge arrester may be mounted within the transformer tank.

High voltage surges actuate the arrester so that damaging electrical potentials are shunted to ground via the arrester before the transformer can be destroyed. Since the internally mounted arrester provides a path for shunting high voltage to ground, it also prevents a valid dielectric test of the transformer insulation system. Thus, it is not possible to test the transformer without disconnecting the internal arrester.

Therefore, the common practice is to disconnect the arrester, dielectrically test the transformer, and then reconnect the arrester or surge protector. In the case of an oil filled transformer which has an arrester mounted therein, it is both awkward and costly to test the transformer and/or arrester. The transformer tank must be opened to so disconnect and reconnect the surge protector. This therefore substantially eliminates field and/or installation evaluation of the transformer.

Still another condition which leads to cost problems and design restrictions is the need heretofore wherein an arrester failure should result in an open circuit fault. For example, most arresters are designed to melt open an isolating fuse link or to fracture and result in an open circuit condition when a transient persists for a period of time. Thereafter, it is necessary to disassemble the transformer and clean and remove all of the arrester parts from the transformer housing. This is especially difficult when the transformer housing is filled with oil. Further, when an under oil arrester mounted in an oil filled transformer fails there is no readily visible means to indicate the arrester failure.

SUMMARY OF THE INVENTION

According to the present invention, we provide a new and improved means for testing a single or multiphase high voltage apparatus having an arrester mounted therein without having to either open its housing or partially disassemble it.

Accordingly, an object of the invention is to provide oil filled high voltage apparatus with arresters or surge protectors which do not have to be disconnected in order to test the transformer either in the factory after manufacture and before shipment or in the field during operation. A further object is to provide the means for remotely separating or isolating the apparatus from the surge protector.

Another object of the invention is to provide a visual indication of the destruction of a surge arrester mounted within a transformer housing so that workers in the field can quickly tell if a transformer must be tested and repaired or replaced.

Yet another object of the invention is to provide means whereby an internally mounted arrester no longer has to fail in an open circuit condition. Here, an object is to enable a an arrester to fail in a short circuit mode and still to give ample "open circuit" isolation.

An oil filled transformer has suitably mounted in its transformer housing a surge arrester of the metal oxide varistor type. An isolator is externally mounted on the transformer housing and has an external visible link thereon. The visible ground wire connected to the isolator is connected to a ground point outside the housing. The other end of the isolator is connected to the arrester inside the housing. Thus, the arrester is connected from a ground point outside the transformer housing through the isolator. High voltage transients are conducted to ground via the arrester. As stated above, the arrester may be activated or destroyed by high voltage and high current transients. When the energy level of the transient is sufficient to damage the arrester it will also be sufficient to blow-off the visible ground lead and disconnect the external ground connection. Thus a man in the field can readily see when the arrester internally mounted in a transformer tank has been damaged.

Further, the externally mounted isolator enables the transformer to be readily tested. To test the transformer of the present invention, the ground connection outside the transformer is disconnected from the isolator. This leaves the arrester in an open circuit condition so that the transformer may be tested via its external wires without interference from the arrester. If required, an insulating cap can be placed over the isolator to provide greater insulation to ground during the dielectric tests.

BRIEF DESCRIPTION OF THE DRAWINGS

Preferred embodiments of the invention are shown in the attached drawings, wherein.

DETAILED DESCRIPTION OF THE INVENTION

Figure 1:
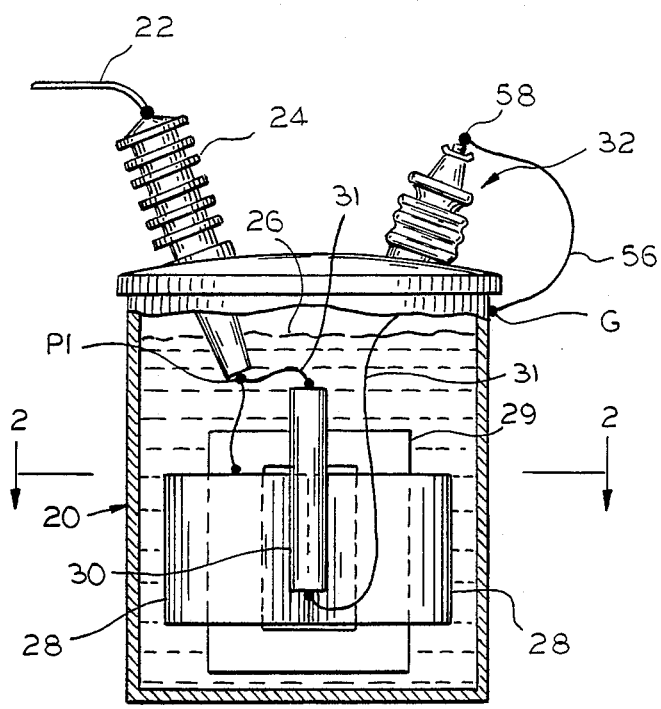
FIG. 1 schematically illustrates a two coil transformer in an oil filled housing with an under oil arrester in a vertical position between transformer coils.
Figure 2:
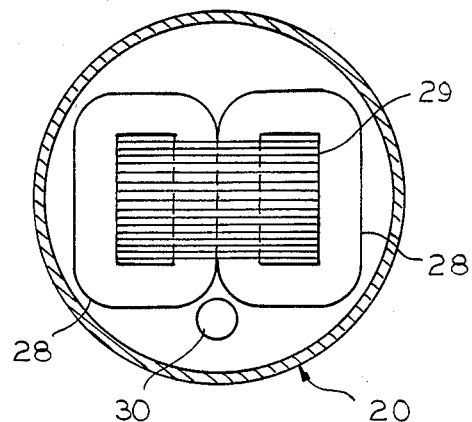
FIG. 2 is a cross-section taken along line 2—2 of FIG. 1.

FIGS. 1 and 2 show a transformer housing 20 coupled to a high voltage line 22 via a primary insulated bushing 24. The housing is substantially full of oil, up to level 26 or other insulating media. Oil is commonly used within the housing to provide the required dielectric strength.

Inside the housing, an oil insulated transformer is provided in any conventional design. We illustrate here two coils 28, on a core 29 in a conventional manner. The exact design of the transformer is not relevant to our invention.

The transformer has a primary wire 22 connected to an insulated bushing 24 on the exterior of tank 20. The external connections 22 and point G are available for conducting specified dielectric tests.

Enclosed within tank 20 is any suitable and known arrester or surge protector 30 which is designed to protect the transformer from high voltage. The preferred arrester is a metal oxide varistor type which provides a non-linear resistance that decreases under over voltage conditions. If the voltage transient is high enough, the resistance of arrester 30 significantly decreases, limiting the over voltage applied to the potential point P1, thereby protecting the transformer winding 28.

The arrester 30 is preferably positioned within the tank 20 in a position which minimizes the length of the lead lines 31, while placing the arrester in a mechanically safe and fully protected position. The short lead lines are desirable primarily to prevent their impedance from increasing the overvoltage stress on the winding 28.

The arrester 30 is grounded at point G, via a through the wall external insulator/isolator 32 and connected, to a high potential point P1. High potential point P1 is between primary bushing 24 and transformer coil 28.

Under normal operating conditions, the arrester resistance is high and has no significant effect upon the potential at point P1. However, if lightning, for example, should strike the primary feed line 22, the resulting high voltage transient significantly reduces the resistance of arrester 30 in order to conduct the transient to ground and remove the current surge that might damage the coil 28. Upon cessation of the overvoltage, a sharp increase in resistance of the arrester takes place and the current through the arrester 30 returns to the magnitude typical for normal service.

Figure 3:
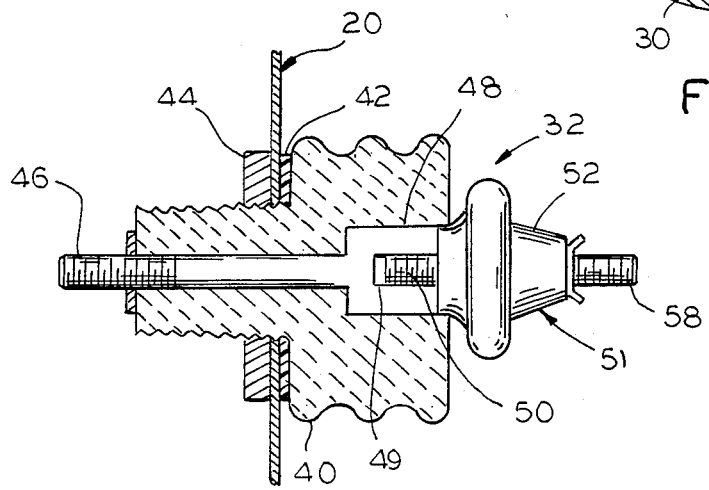
FIG. 3 is a cross-section which shows a wall or cover mounted feed-through bushing insulator and arrester disconnector.

Referring to FIG. 3, the external wall or cover mounted arrester insulator/isolator 32 is shown in a partial cross sectional view as mounted on the transformer tank 20. The insulator/isolator 32 may have any appropriate configuration. We use an insulator/isolator 32 having a feed-thru bushing insulator 40 with an appropriate isolator 51 mounted thereon. The isolator has an appropriate disconnector 52 releasably mounted thereon. The insulator bushing 40 is made of any appropriate insulating material. The insulating material and insulating characteristics of the insulator bushing are such that, with the ground lead removed from the isolator, standard dielectric high potential tests may be run on the transformer. In some cases it may be desirable to encase the external isolator 51 with an insulating cap (not shown) to provide additional voltage withstand capability.

In general, there is a hole in the wall or cover of the transformer tank 20 through which the insulator bushing 40 may pass. Threads T are formed on the inside end of insulator bushing 40. A compression gasket 42 is trapped between insulator 40 and tank 20 on one side and a compression nut 44 is threaded onto the threaded end of insulator 40 on the inside of the tank 20. When compression nut 44 is tightened, the gasket 42 forms an oil tight seal between tank 20 and insulator 40. The oil seal is necessary to prevent oil leakage or moisture ingress.

Extending through insulator 40 is a threaded stud 46 which has a threaded receiver hole 49. The isolator 51 has a threaded terminal 50 that is screwed into the hole 49. An advantage of this construction is that the isolator 51 and/or disconnector 52 may be replaced without having to either open tank 20 or break the oil seal at gasket 42. The arrester 30 is connected to stud 46 via wire 31 (FIG. 1). A ground wire 56 is connected from ground point G to a stud 58 (FIG. 3) on the arrester disconnector.

The disconnector 52 may be operated by a blank 22-cal. cartridge or other means such that the frangible housing of disconnector 52 is broken and the lead connected to 58 is disconnected from the arrester. The disconnector 52 is actuated when enough heat is generated to ignite the powder (not shown) in the disconnector 52. The heat occurs responsive to the high current conducted by the arrester during or after conditions such as voltage transients.

Although we have described the use of a power charge disconnector, any suitable thermal type release disconnector may be used.

Figure 4:
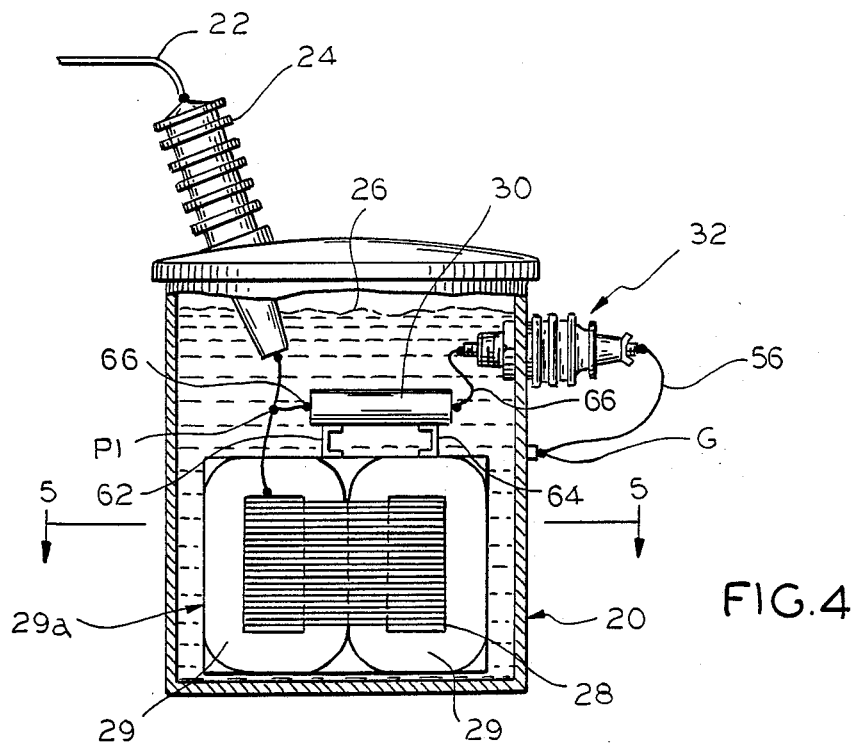
FIG. 4 is a schematic illustration of a single coil transformer having a horizontal surge arrester.
Figure 5:
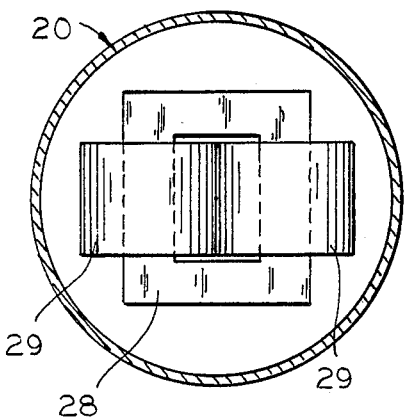
FIG. 5 is a cross-section taken along line 5—5 of FIG. 4.

In order to test the transformer without involving the arrester and surge protector 30, the ground wire 56 (FIG. 1) is disconnected from the lug 58, thereby removing ground from the arrester, which open circuits the arrester 30. The test may then be carried out by simply measuring the electrical characteristics on the transformer wire emerging from the housing 20 and point G. An insulating cap can be placed over the insulator/isolator so that the open circuited arrester 30 has no effect upon the testing. After the test is completed, ground wire 56 is reconnected to the lug 58. Another embodiment is shown in (FIGS. 4, 5) where the insulator/isolator 32 is mounted in the tank wall instead of in the cover. Here, the same reference numerals are used to identify the same parts that are shown in FIGS. 1, 2. Therefore, they will not be described a second time.

For this type of transformer, the arrester 30 is shown mounted horizontally on insulated brackets 62, 64 which are secured to the transformer core/coil assembly 29a.

Heretofore, arresters were usually designed to fail in an open circuit mode. This requirement caused arresters to be designed to fall apart or otherwise destroy themselves in order to be certain that there is a physical gap in the circuit after a failure has occurred. As a result, after a failure, the broken parts of the perished arrester remained in the transformer tank.

According to the invention, when a disconnector 52 (FIG. 3) operates, the frangible section ruptures and the ground wire 56 is blown off along with the arrester ground stud 58, thereby producing an open circuit between potential point P1 and ground G. This means that the arrester may not be either a short or an open circuit. Therefore, it is more probable that the arrester may not fall apart. Thus the whole arrester may be removed and the transformer placed back in service after replacing the arrester, and changing the oil.

Figure 6:
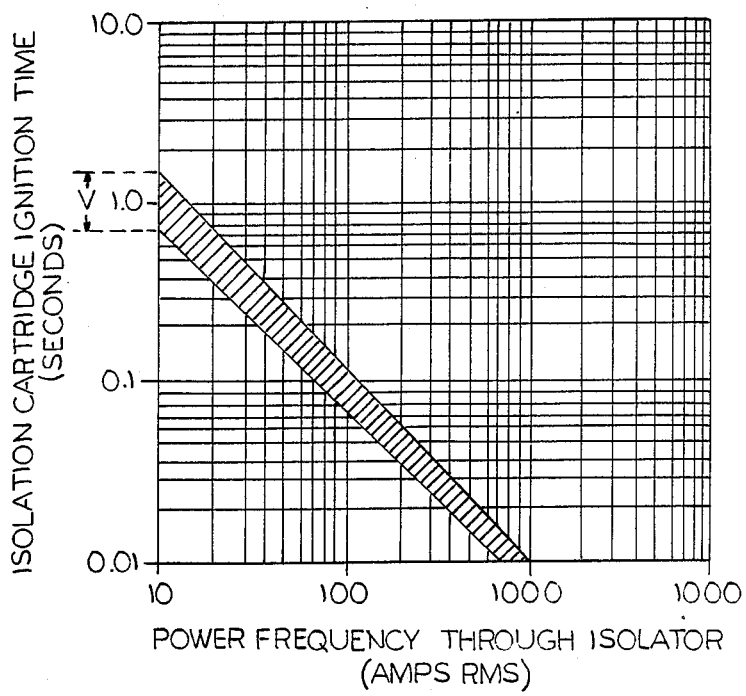
FIG. 6 is a graph showing a typical arrester isolator disconnect characteristics that are used by the invention.

FIG. 6 illustrates the desired disconnecting fault current-time characteristic for a disconnector 52. Some high voltage conditions (such as lightning strokes) do not last long enough to generate a current which is heavy enough to destroy the arrester 30. Therefore, it would not be either necessary or desirable to actuate the disconnector 52. On the other hand, if the energy level is high enough, it might be desirable to have an instantaneous disconnect.

The horizontal axis of FIG. 6 indicates the root mean square amperage of the fault current. The vertical axis indicates the time required to ignite an explosive charge after the indicated amperage occurs. The operating range or band 70 indicates the allowable variance V for disconnector operation.

The advantages of the invention should now be clear. It is possible to conduct testing upon the transformer after manufacture and before shipment without having to either open the cover or disconnect the arrester. In the event of arrester failure, blowing off the ground wire 56 gives a visual indication to a lineman so that he will know that maintenance is required, and to take the proper safety precautions. The failure of an arrester no longer must be an open circuit failure; therefore, it may not be necessary to design an arrester to have an internal disconnecting feature.

For convenience of description, this specification referred to "oil filled transformers". However, it should be understood that the principles of our invention may also be applied to many other types of transformers or other high voltage devices with other insulating systems which may require similar protection and testing. Therefore, the invention is to be construed broadly enough to cover all equivalent structures including both single and three phase devices.

Those who are skilled in the art will readily perceive how to modify the invention. Therefore, the appended claims are to be construed to cover all equivalent structures which fall within the true scope and spirit of the invention.

The claimed invention is:

1. A high voltage protection device for an oil filled high voltage apparatus having a sealed housing containing at least an incoming primary wire connected to the high voltage apparatus, said protection device comprising an arrester insulator/isolator penetrating said sealed housing and sealed to said housing at a location of said penetration, an arrester inside said housing and coupled from said arrester insulator/isolator to a point between said primary wire and said high voltage apparatus, and a removable ground wire and said high voltage apparatus, and a removable ground wire outside said housing and extending from said arrester insulator/isolator to a ground point.

2. The protection device of claim 1 comprising means for removing and replacing said arrester insulator/isolator from the outside of said housing without having to either open said housing or break said seal.

3. The protection device of claim 2 wherein said ground wire may be disconnected from said arrestor insulator/isolator whereby if said arrestor should fail in either an open or a closed circuit condition, said ground wire being positioned to be visible from outside said housing for indicating a need for maintenance.

4. The protection device of claim 3 wherein said arrester is located at a position within said housing wherein the length of the arrester lead lines are relatively short while said position provides a mechanical support and protection for said arrester.

5. The protection device of claim 4 wherein the oil filled high voltage apparatus is an oil filled single or multiphase transformer.

6. The protection device of claim 4 wherein the oil filled high voltage apparatus is an oil filled transformer having a transformer core and coil assembly within said housing, said coil assembly connected to said incoming primary wire and having two coils and said arrester mounted between said two coils.

7. The protection device of claim 4 wherein the oil filled high voltage apparatus is an oil filled transformer having a transformer core and coil assembly within said housing, said coil assembly connected to said incoming primary wire and which has one coil and said arrester is mounted above said coil.

8. A method of testing a transformer in an oil filled housing, comprising the steps of:
   (a) providing an external arrester insulator/isolator penetrating said housing for making an electrical connection through the housing while preventing a leaking of oil from said housing;
   (b) electrically coupling an arrester inside said housing between an interior end of said arrester isolator and a predetermined potential point within said housing;
   (c) removably and electrically coupling an exterior end of said arrester isolator to a ground potential point;
   (d) removing said ground coupling from said exterior end of said arrester isolator;
   (e) testing said transformer by measuring electrical characteristics on transformer connections emerging from said housing; and
   (f) reconnecting said ground coupling to said exterior end of said arrester isolator after said testing is completed 9. The method of claim 8 further comprising the added step of providing a coupling between said arrester isolator and said seal to said housing whereby said arrester isolator may be replaced without entering said housing or breaking said seal.

10. The method of claim 8 wherein said arrester isolator is disconnected from said removable electrical coupling of step (c) in response to an arrester failure.

11. The method of claim 10 further comprising the added step of positioning said removable electrical coupling of step (c) in a location which gives a visible indication responsive to said disconnecting of said arrester isolator from said electrical coupling to indicate that said arrester failed.

12. The method of claim 8 further comprising the added step of supporting said arrester in a mechanically protected position where lead lines from said arrester are relatively short.

13. An arrester isolator device comprising an insulator bushing for penetrating through a transformer housing, a sealing gasket engaged by said bushing on one side of said wall for making a sealed joint between said bushing and said wall, a compression means on the bushing and on the other side of said wall for holding said gasket in place and sealing said joint, a stud extending through said insulator for coupling electrical connections from the inside to the outside of said housing, means on an exterior end of said stud for removably attaching an arrester isolator thereto whereby said arrester isolator may be removed and replaced without either opening said housing or breaking said seal, means outside said housing for breaking electrical circuits completed through said insulator and arrester isolator, and means for activating said means outside said housing to break said electrical circuit.

14. A transformer comprising a housing containing a core and coil assembly, a primary bushing for bringing power into said housing, and bushing being electrically coupled to said coil. arrester isolator means extending through said housing, arrester means inside said housing coupled between said arrester isolator means and said electrical coupling between said primary bushing and said coil, and a ground wire outside said housing removably coupled between said arrester isolator and a ground potential point.

15. The transformer of claim 14 wherein the transformer has oil within the housing, said arrester is a metal oxide varistor type, and arrester isolator means has an insulator bushing extending through the housing and sealingly connected to the housing, a stud extending from within the housing through the insulating bushing, an isolator releasably connected to the insulating bushing and electrically connected to the stud, ground connection means on said isolator to connect a ground to said stud, means causing the isolator to disconnect from the insulating bushing under predetermined conditions, and said insulating bushing having insulating characteristics such that with a ground lead removed from the isolator standard dielectric high potential tests may be run on the transformer.

* * * * *